(12) United States Patent
Ardo et al.

(10) Patent No.: US 10,123,020 B2
(45) Date of Patent: Nov. 6, 2018

(54) BLOCK LEVEL UPDATE RATE CONTROL BASED ON GAZE SENSING

(71) Applicant: Axis AB, Lund (SE)

(72) Inventors: Bjorn Ardo, Lund (SE); Fredrik Pihl, Malmo (SE)

(73) Assignee: Axis AB, Lund (SE)

( * ) Notice: Subject to any disclaimer, the term of this patent is extended or adjusted under 35 U.S.C. 154(b) by 121 days.

(21) Appl. No.: 15/395,790

(22) Filed: Dec. 30, 2016

(65) Prior Publication Data

US 2018/0192057 A1 Jul. 5, 2018

(51) Int. Cl.
| | |
|---|---|
| *H04N 7/12* | (2006.01) |
| *H04N 11/02* | (2006.01) |
| *H04N 19/146* | (2014.01) |
| *H04N 19/132* | (2014.01) |
| *H04N 19/159* | (2014.01) |
| *H04N 19/46* | (2014.01) |
| *G06F 3/01* | (2006.01) |
| *H04N 19/177* | (2014.01) |

(Continued)

(52) U.S. Cl.
CPC ........... *H04N 19/146* (2014.11); *G06F 3/013* (2013.01); *H04N 19/132* (2014.11); *H04N 19/159* (2014.11); *H04N 19/46* (2014.11); *H04N 19/167* (2014.11); *H04N 19/177* (2014.11); *H04N 19/182* (2014.11); *H04N 19/184* (2014.11)

(58) Field of Classification Search
CPC .... H04N 19/167; H04N 19/182; H04N 19/59; H04N 19/61; G02B 27/0093; G06F 3/013; G06F 3/147; G06T 1/20; G06T 3/40; G09G 2320/0261; G09G 2340/02; G09G 2340/0407; G09G 2340/0457; G09G 5/391

See application file for complete search history.

(56) References Cited

U.S. PATENT DOCUMENTS

| | | | |
|---|---|---|---|
| 4,513,317 A | 4/1985 | Ruoff, Jr. | |
| 5,703,637 A | 12/1997 | Miyazaki et al. | |

(Continued)

FOREIGN PATENT DOCUMENTS

EP 2838268 A1 2/2015

OTHER PUBLICATIONS

Reeves, T.H. et al., "Adaptive Foveation of MPEG Video," Proceedings of ACM Multimedia 96, Boston, Nov. 18-22, 1996, published Feb. 1, 1997, pp. 231-241.

(Continued)

*Primary Examiner* — Jessica M Prince
(74) *Attorney, Agent, or Firm* — Snyder, Clark, Lesch & Chung, LLP

(57) ABSTRACT

A method decodes video data based on gaze sensing. The method may decode an encoded video stream received from an encoder associated with a camera, and present the decoded video stream on a display of a device. The method may further detect a gaze point of an operator viewing the display, designate locations associated with the decoded video stream, based upon the gaze point, as skip block insertion points. The method may send the locations to the encoder, wherein the encoder reduces an update rate of inter-frame coded blocks corresponding to the skip block insertion points when encoding video data produced by the camera. An apparatus can implement the method to decode video data based on gaze sensing.

24 Claims, 7 Drawing Sheets

(51) Int. Cl.
*H04N 19/167* (2014.01)
*H04N 19/182* (2014.01)
*H04N 19/184* (2014.01)

(56) References Cited

U.S. PATENT DOCUMENTS

| | | |
|---|---|---|
| 6,717,607 B1 | 4/2004 | Lauper et al. |
| 2005/0018911 A1 | 1/2005 | Deever |
| 2007/0074266 A1 | 3/2007 | Raveendran et al. |
| 2012/0146891 A1 | 6/2012 | Kalinli |
| 2012/0236935 A1* | 9/2012 | Dutt .................... H04N 19/176 375/240.03 |
| 2015/0036736 A1 | 2/2015 | Lundberg |
| 2017/0054987 A1* | 2/2017 | Rangarajan .......... H04N 19/167 |

OTHER PUBLICATIONS

"This is Eye Tracking," Tobii Group, <http://www.tobii.com/group/about/this-is-eye-tracking/>, accessed Dec. 29, 2016.

Robillard, Julie, "How to Create a Heatmap," Gazepoint, <http://www.gazept.com/faq-items/heatmap/>, Jan. 1, 2014, accessed Dec. 29, 2016.

"Video compression picture types," Wikipedia, <https://en.wikipedia.org/wiki/Video_compression_picture_types>, accessed Dec. 29, 2016.

\* cited by examiner

BLOCK LEVEL UPDATE RATE CONTROL BASED ON GAZE SENSING

BACKGROUND

A video monitoring system may produce a large amount of data when distributing video streams generated by one or more cameras. Because components in the video monitoring system may be interconnected via a network, distributing the video streams can consume a significant amount of network resources. A single operator, when presented with a number of video streams on a display, can only focus their attention on one video stream at a time. Thus, in conventional video monitoring systems, a significant amount of network resources are consumed by the distribution of the video streams that are not being viewed by the operator.

SUMMARY

In one embodiment, a method for decoding video data based on gaze sensing is disclosed. The method may include decoding an encoded video stream received from an encoder associated with a camera and presenting the decoded video stream on a display of a device. The method may include detecting a gaze point of an operator viewing the display and designating locations associated with the decoded video stream, based upon the gaze point, as skip block insertion points. The method may include sending the locations to the encoder, wherein the encoder reduces an update rate of inter-frame coded blocks corresponding to the skip block insertion points when encoding video data produced by the camera.

By reducing the update rate of blocks during encoding based on gaze sensing, the bitrates of video streams in the operator's peripheral view may be reduced from those having the full focus of the operator. Moreover, decoding of the video streams with blocks having lower update rates will reduce computational load on both the encoder and decoder, and thus save on power consumption in camera encoding the video streams, and in monitoring stations decoding the video streams.

In one embodiment, the method may include presenting the decoded video stream in a window having a primary focus of the operator on the display of the device and determining that the gaze point of the operator is within the boundaries of the window having the primary focus of the operator. The method may include determining a foveal vision area within the window having the primary focus of the operator, and designating locations associated with the decoded video stream outside the foveal vision area as skip block insertion points.

In one embodiment, the method may include decoding at least one additional encoded video stream and presenting the decoded video stream and the at least one additional decoded video stream each in separate windows from a plurality of windows on the display of the device, or on another display of the device. The method may include determining, based upon the gaze point, a window from the plurality of windows having a primary focus of the operator, and designating locations as skip block insertion points within the decoded video stream associated with the at least one window not having the primary focus of the operator.

In one embodiment, the method may include determining, based upon the gaze point, a foveal vision area within the window having the primary focus of the operator, and designating locations outside the foveal vision area as skip block insertion points in the decoded video stream associated with the window having the primary focus of the operator.

In one embodiment, the method may include determining a group of pictures (GOP) length for a secondary decoded video stream associated with the at least one window not having the primary focus of the operator which is greater than the GOP length for the decoded video stream associated with the window having the primary focus of the operator. The method may include sending the determined GOP length to an encoder associated with the secondary decoded video stream for encoding video associated with the at least one window not having the primary focus of the operator.

In one embodiment, the method may include determining a distance from the gaze point to the at least one window not having the primary focus of the operator. The method may include increasing the determined GOP length as the distance increases between the gaze point and the at least one window not having the primary focus of the operator.

In one embodiment, the method may include tracking a gaze point for a time period or a distance exceeding a predetermined threshold as the gaze point moves within the window having a primary focus of the operator, correlating the movement of the gaze point and a moving object in the decoded video. The method may include designating the moving object as an object of interest, and preventing the designation of locations as skip block insertion points for locations associated with the object of interest in the decoded video stream.

In one embodiment, the method may include generating an identifier representing the designated object of interest, and saving the identifier in a database containing metadata of the decoded video stream.

In one embodiment, the method may include determining that the gaze point is maintained at substantially the same position on the display for a time period exceeding a predetermined threshold, and increasing a magnification of the decoded video stream in a predetermined area around the gaze point.

In one embodiment, the method may include determining that the gaze point is maintained for a time period exceeding a predetermined threshold on the window having the primary focus of the operator, and increasing the magnification of the window having the primary focus of the operator.

In one embodiment, the method may include determining, as a result of blinking by the operator, that the gaze point disappears and reappears a predetermined number of times within a predetermined period of time, while maintaining substantially the same position on the display, and executing a command associated with the decoded video stream in the area around the gaze point.

In one embodiment, executing the command may include changing the magnification of the decoded video stream in the area around the gaze point, or saving an identifier in a database tagging the decoded video stream in the area around the gaze point.

In one embodiment, the method may include tracking positions of the gaze point over a period of time, and predicting the next position of the gaze point based on the tracked positions of the gaze point.

In one embodiment, the method may include receiving a merged encoded video stream which includes a first component video stream having inter-frames which include skip blocks, and a second component video stream having a lower pixel density than the first component video stream sequence, wherein the second component video stream is temporally and spatially associated with the first component video stream. The method may include identifying skip blocks in inter-frames of the first component video stream and decoding inter-frames of the first component video stream in blocks which are not skip blocks. The method may include decoding inter-frames of the second component video stream, upscaling inter-frames in the decoded second component video stream to match the pixel density of the inter-frames in the decoded first component video stream. The method may include identifying pixels in the upscaled decoded second component video stream which correspond to the skip blocks locations in the decoded first component video stream. The method may include extracting the identified pixels in the decoded second component video stream, and inserting the extracted pixels in corresponding locations of the skip blocks in the decoded first encoded bit stream.

In one embodiment, a method for encoding video data based on gaze sensing is disclosed. The method may include receiving video data captured by at least one sensor array and receiving locations associated with a decoded video stream to designate skip block insertion points for encoding the received video data, wherein the locations are based on gaze points determined at a device. The method may include identifying, based upon the received locations, skip block insertion points prior to encoding the received video data, wherein the skip block insertion points designate blocks within inter-frames having reduced update rates. The method may include determining, for the identified skip block insertion points, a frequency for the reduced update rate and encoding inter-frames having blocks associated with the identified skip block insertion points based on the determined frequency.

In one embodiment, the method may include generating a first video sequence from the received video data, and generating a second video sequence from the received video data having a lower pixel density than the first video sequence, wherein the second video sequence is temporally and spatially similar to the first video sequence. The method may include indicating pixels of relevance in the first video sequence, wherein the identified skip block insertion points are designated as not being relevant and encoding the indicated pixels of relevance in the first video sequence to produce a first encoded video stream, wherein the pixels designated as not being relevant are encoded using skip blocks. The method may include encoding the second video sequence to produce a second encoded video stream and merging the first encoded video stream and the second encoded video stream. The method may include sending the merged encoded video stream to the device.

In one embodiment, the method wherein generating the second video sequence may include digitally downsampling the first video sequence in two dimensions.

In one embodiment, the method further indicating pixels of relevance may include generating masks for the first video sequence.

In one embodiment, a device configured to decode video data based on gaze sensing is disclosed. The device may include a display, a communication interface configured to exchange data over a network, a processor, coupled to the display and the communication interface, and a memory, coupled to the processor, which stores instructions. The instructions may cause the processor to decode an encoded video stream received from an encoder associated with a camera, present the decoded video stream on the display, detect a gaze point of an operator viewing the display, designate locations associated with the decoded video stream, based upon the gaze point, as skip block insertion points, and send the locations to the encoder. The encoder reduces an update rate of inter-frame coded blocks corresponding to the skip block insertion points when encoding video data produced by the camera.

In one embodiment, the memory may include instructions that further cause the processor to present the decoded video stream in a window having a primary focus of the operator on the display of the device, determine that the gaze point of the operator is within the boundaries of the window having the primary focus of the operator, determine a foveal vision area within the window having the primary focus of the operator, and designate locations associated with the decoded video stream outside the foveal vision area as skip block insertion points.

In one embodiment, the memory may include instructions that cause the processor to decode at least one additional encoded video stream, present the decoded video stream and the at least one additional decoded video stream each in separate windows from a plurality of windows on the display, determine, based upon the gaze point, a window from the plurality of windows having a primary focus of the operator, and designate locations as skip block insertion points within the decoded video stream associated with the at least one window not having the primary focus of the operator.

In one embodiment, the memory may include instructions that cause the processor to: determine, based upon the gaze point, a foveal vision area within the window having the primary focus of the operator, and designate locations outside the foveal vision area as skip block insertion points in the decoded video stream associated with the window having the primary focus of the operator.

In one embodiment, a camera to encode video data based on gaze sensing is disclosed. The camera may include a sensor array, a communication interface configured to exchange data over a network, a controller, an image processor, and a video encoder, coupled to the sensor array and the communication interface, and a memory, coupled to the controller, the image processor, and the video encoder. The memory stores instructions that may cause the controller, the image processor, or the video encoder to receive video data captured by the sensor array, and receive locations associated with a decoded video stream to designate skip block insertion points for encoding the received video data. The locations may be based on gaze points determined at a client device, identify, based upon the received locations, skip block insertion points prior to encoding the received video data, wherein the skip block insertion points designate blocks within inter-frames having reduced update rates, determine, for the identified skip block insertion points, a frequency for the reduced update rate, and encode inter-frames having blocks associated with the identified skip block insertion points based on the determined frequency.

In one embodiment, the memory may include instructions further causing at least one of the controller, the image processor, or the video encoder to: generate a first video sequence from the received video data, generate a second video sequence from the received video data having a lower pixel density than the first video sequence, wherein the second video sequence is temporally and spatially similar to the first video sequence, indicate pixels of relevance in the first video sequence, wherein the identified skip block insertion points are designated as not being relevant, encode the indicated pixels of relevance in the first video sequence to produce a first encoded video stream, wherein the pixels designated as not being relevant are encoded using skip blocks, encode the second video sequence to produce a second encoded video stream, merge the first encoded video stream and the second encoded video stream. and send the merged encoded video stream to the client device.

DETAILED DESCRIPTION

Figure 1:
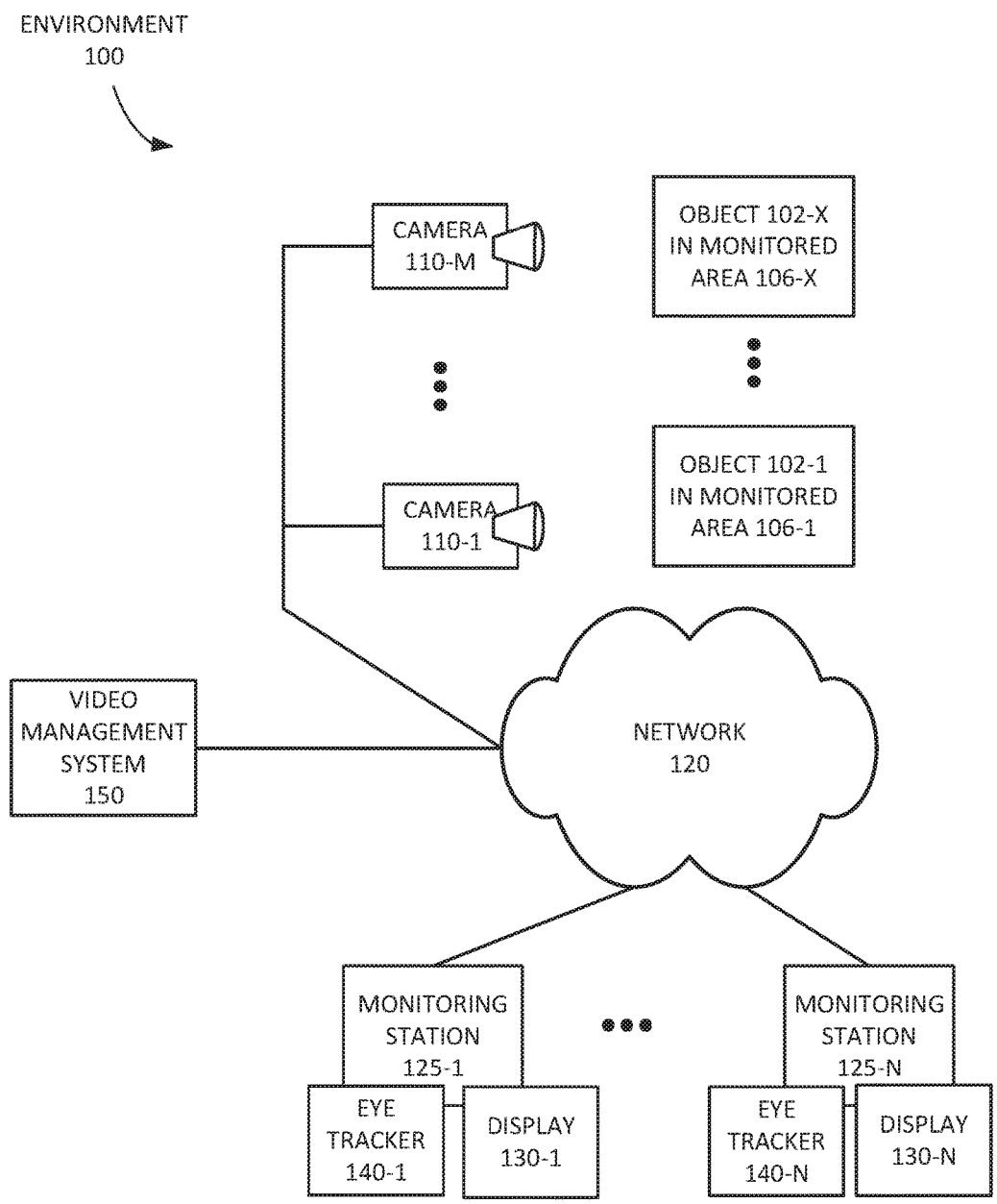
FIG. 1 is a block diagram illustrating an exemplary environment including eye tracking in one embodiment.

The following detailed description refers to the accompanying drawings. The same reference numbers in different drawings identify the same or similar elements.

Given the large amount of data that video monitoring systems generate over arbitrary time periods, processing, distributing, and retrieving the collected data can become resource intensive, particularly in terms of processing and/or network resource utilization. When an operator monitors multiple video streams over a network, much of the data presented on a display of a monitoring station cannot be the focus of the operator.

To more efficiently use processing and/or network resources in a video monitoring system, embodiments described below relate to processes and systems that use eye tracking to determine the focus of an operator, and lower update rates for blocks in the video streams which are not the focus of the operator. Accordingly, by sensing the gaze of the operator, portions of a single video stream which are in the peripheral view of the operator may have the update rate of blocks reduced. Additionally or alternatively, when multiple streams are being presented to the user in separate windows, the video streams which are in the peripheral view of the operator may have the update rates of blocks reduced when the video streams are encoded.

By reducing the update rate of blocks during encoding based on gaze sensing, the bitrates of video streams in the operator's peripheral view may be reduced from those having the full focus of the operator. Moreover, decoding of the video streams with blocks having lower update rates will reduce computational load on both the encoder and decoder, and thus save on power consumption in camera encoding the video streams, and in monitoring stations decoding the video streams.

Reducing the update rate of blocks may be performed, for example, using the techniques those described in U.S. Patent Application Pub. No. US 2015/0036736, entitled "Method, Device and System for Producing a Merged Digital Video Sequence," published on Feb. 5, 2015, assigned to Axis AB, which is incorporated herein by reference.

For example, reducing the update rate of blocks may be accomplished by forcing the encoder, when encoding inter-frames, to send SKIP blocks in frames of video. When a SKIP block is indicated for a portion of video, no image data is sent for that portion of video even though the input image might have changed from the previous image in that area.

Embodiments presented herein may be applied with video encoding/decoding standards, such as, for example, ISO/MPEG family (MPEG-1, MPEG-2, MPEG-4) and to the video recommendations of the ITU-H.26X family (H.261, H.263 and extensions, H.264 and HEVC, the also known as the H.265 standard). Embodiments presented herein can also be applied to other types of video coding standards, e.g. Microsoft codecs belonging to the WMV-family, On2 codecs (e.g. VP6, VP6-E, VP6-S, VP7 or VP8) or WebM.

When performing video encoding to reduce bitrates, a frame to be encoded may be partitioned into smaller coding units (blocks, macro-blocks, etc.) which may be compressed and encoded. For inter-frame encoding, each of the blocks may be assigned one or several motion vectors. A prediction of the frame may constructed by displacing pixel blocks from past and/or future frame(s) according to the set of motion vectors. Afterwards, the block displaced by the motion vectors in a prior frame may be compared to a current frame, and the difference, called the residual signal, between the current frame to be encoded and its motion compensated prediction is entropy encoded in a similar way to intra-coded frames by using transform coding.

The aforementioned inter-frame encoding may be prevented by using "skip blocks." In other words, a skip block may be "coded" without sending residual error or motion vectors. Instead, the encoder may only record that a skip block was designated for a particular block location in the inter-frame, and the decoder may deduce the image information from other blocks already decoded. In an embodiment, the image information of a skip block may be deduced from a block of the same frame or a block in a preceding frame of the digital video data.

As used herein, intra-frames may be encoded without any reference to any past or future frame, and are called I-frames. Inter-frames may be encoded using either mono-directionally predicted frames, called P-frames, or as bi-directionally predicted frames, called B-frames. Both P-frames and B-frames may include blocks that encode new data not found anywhere in earlier frames, but they may be rare. The I-frames may comprise either scene change frames, placed at the beginning of a new group of frames corresponding to a scene change, where no temporal redundancy is available, or refresh frames, placed in other locations where some temporal redundancy is available. I-frames are usually inserted at regular or irregular interval to have refresh point for new stream encoders or as a recovery point for transmission errors.

The I-frames may bound a number of P-frames and B-frames, or in some embodiments, a number of P-frames only, in what is called a "group of pictures" (GOP). The GOP length may include 30 frames of video sampled a 30 frames per second, which implies that one I-frame may be followed by 29 P-frames. In other embodiments, the GOP may be dynamic and vary based on scene content, video quality, and/or gaze information provided by an eye tracker.

FIG. 1 is a block diagram illustrating an exemplary environment 100 including eye tracking in one embodiment. Environment 100 may be, for example, a monitoring system to secure an area or provide public safety. As shown in FIG. 1, environment 100 may include cameras 110-1 through 110-M, network 120, a video management system (VMS) 150, monitoring stations 125-1 through 125-N, eye trackers 140-1 through 140-N, and/or displays 130-1 through 130-N. Environment 100 may also include various non-imaging detectors such as, for example, a motion detector, a temperature detector, a smoke detector, etc. (not shown).

Cameras 110-1 through 110-M (referred to as "camera 110," plurally as "cameras 110," and specifically as "camera 110-*x*") capture images and/or video of monitored areas 106. A monitored area 106 may be monitored by one or more cameras 110. Objects 102 may include any object, such as a door, a person, an animal, a vehicle, a license plate on a vehicle, etc.

Camera 110 may capture image data using visible light, infrared light, and/or other non-visible electromagnetic radiation (e.g., ultraviolet light, far infrared light, terahertz radiation, microwave radiation, etc.). Camera 110 may include a thermal camera and/or a radar for radar imaging. The captured image data may include a continuous image sequence (e.g., video), a limited image sequence, still images, and/or a combination thereof. Camera 110 may include a digital camera for capturing and digitizing images and/or an analog camera for capturing images and storing image data in an analog format.

Camera 110 may include sensors that generate data arranged in one or more two-dimensional array(s) (e.g., image data or video data). As used herein, "video data" and "video" may be referred to more generally as "image data" and "image," respectively. Thus, "image data" or an "image" is meant to include "video data" and "videos" unless stated otherwise. Likewise, "video data" or a "video" may include a still image unless stated otherwise.

Other monitoring devices or sensors may capture information from monitored areas 106. For example, a motion detector (e.g., something other than a camera) may detect motion in area 106-1. The motion detector may include a proximity sensor, a magnetic sensor, an intrusion sensor, a pressure sensor, an infrared light sensor, a radar sensor, and/or a radiation sensor. As another example, a smoke detector may detect smoke in area 106-1. The smoke detector may also include a heat sensor.

Monitoring stations 125-1 through 125-N are coupled to displays 130-1 through 130-N (individually "monitoring station 125" and "display 130," respectively). In one embodiment, monitoring stations 125-1 through 125-N are also coupled to eye trackers 140-1 through 140-N (individually "eye tracker 140"). Monitoring station 125 and display 130 enable operators (not shown in FIG. 1) to view images generated by cameras 110. Eye tracker 140 tracks the gaze of an operator viewing display 130. Each monitoring station 125-*x*, display 130-*x*, and eye tracker 140-*x* may be a "client" for an operator to interact with the monitoring system shown in environment 100.

Display 130 receives and displays video stream(s) from one or more cameras 110. A single display 130 may show images from a single camera 110 or from multiple cameras 110 (e.g., in multiple frames or windows on display 130). A single display 130 may also show images from a single camera but in different frames. That is, a single camera may include a wide-angle or fisheye lens, for example, and provide images of multiple areas 106. Images from the different areas 106 may be separated and shown on display 130 separately in different windows and/or frames. Display 130 may include a liquid-crystal display (LCD), a light-emitting diode (LED) display, an organic LED (OLED) display, a cathode ray tube (CRT) display, a plasma display, a laser video display, an electrophoretic display, a quantum dot display, and/or any other type of display device.

Eye tracker 140 includes a sensor (e.g., a camera) that enables VMS 150 (or any device in environment 100) to determine where the eyes of an operator are focused. For example, a set of near-infrared light beams may be directed at an operator's eyes, causing reflections in the operator's corneas. The reflections may be tracked by a camera included in eye tracker 140 to determine the operator's gaze area. The gaze area may include a gaze point and an area of foveal focus. For example, an operator may sit in front of display 130 of monitoring station 125. Eye tracker 140 determines which portion of display 130 the operator is focusing on. Each display 130 may be associated with a single eye tracker 140. Alternatively, an eye tracker 140 may correspond to multiple displays 130. In this case, eye tracker 140 may determine which display and/or which portion of that display 130 the operator is focusing on.

Eye tracker 140 may also determine the presence, a level of attention, focus, drowsiness, consciousness, and/or other states of a user. Eye tracker 140 may also determine the identity of a user. The information from eye tracker 140 can be used to gain insights into operator behavior over time or determine the operator's current state. In some implementations, display 130 and eye tracker 140 may be implemented in a virtual reality (VR) headset worn by an operator. The operator may perform a virtual inspection of area 106 using one or more cameras 110 as input into the VR headset.

Network 120 may include one or more circuit-switched networks and/or packet-switched networks. For example, network 120 may include a local area network (LAN), a wide area network (WAN), a metropolitan area network (MAN), a Public Switched Telephone Network (PSTN), an ad hoc network, an intranet, the Internet, a fiber optic-based network, a wireless network, and/or a combination of these or other types of networks.

VMS 150 may include one or more computer devices, such as, for example, server devices, which coordinate operation of cameras 110, display devices 130, and/or eye tracking system 140. VMS 150 may receive and store image data from cameras 110. VMS 150 may also provide a user interface for operators of monitoring stations 125 to view image data stored in VMS 150 or image data streamed from cameras 110.

In some embodiments, environment 100 does not include a separate VMS 150. Instead, the services provided by VMS 150 are provided by monitoring stations 125 and/or cameras 110 themselves or in a distributed manner among the devices in environment 100. Likewise, VMS 150 may perform operations described as performed by camera 110. For example, VMS 150 may analyze image data to detect motion rather than camera 110.

Although FIG. 1 shows exemplary components of environment 100, in other implementations, environment 100 may include fewer components, different components, differently arranged components, or additional components than depicted in FIG. 1. Additionally or alternatively, any one device (or any group of devices) may perform functions described as performed by one or more other devices.

Figure 2:
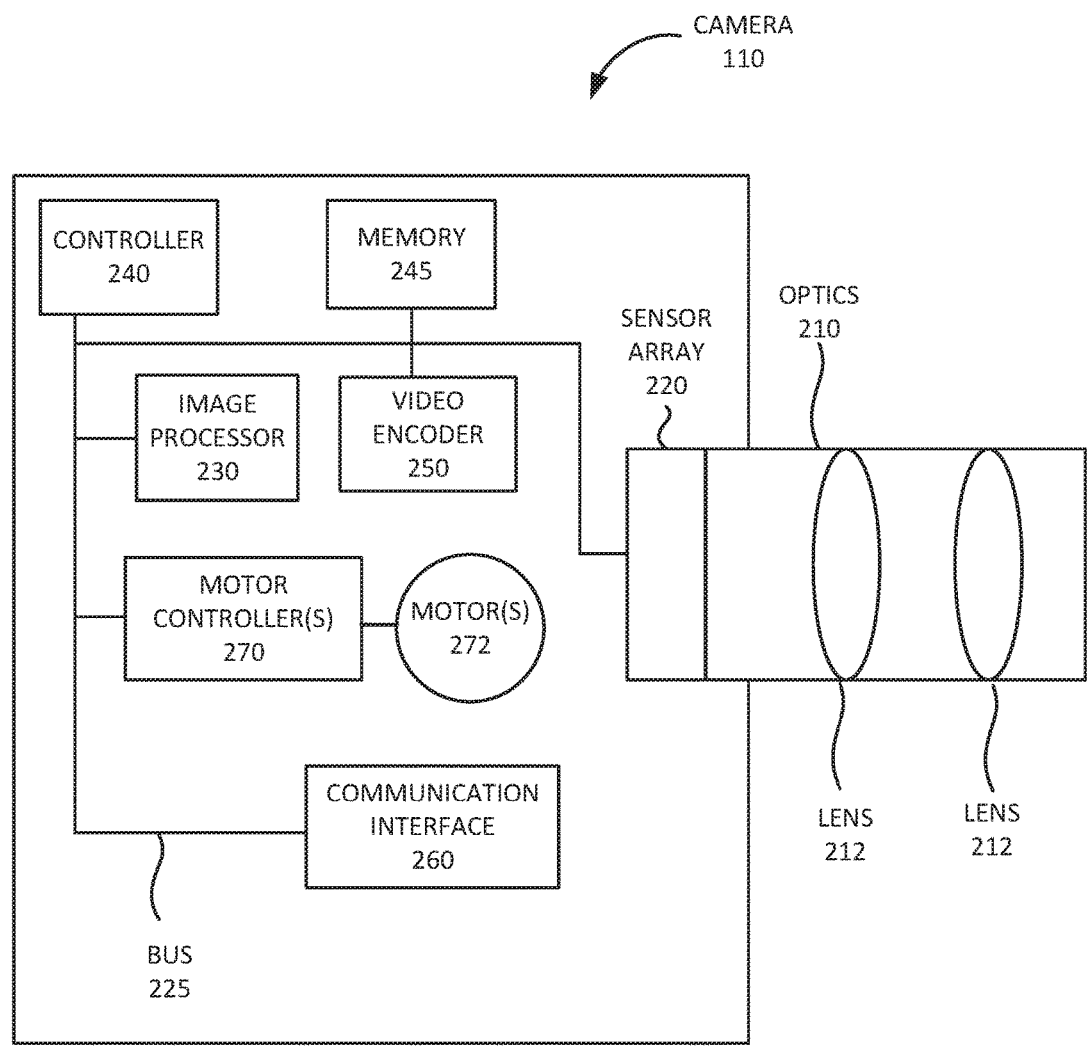
FIG. 2 is a block diagram illustrating exemplary components of a camera in one embodiment.

FIG. 2 is a block diagram illustrating exemplary components of a camera in one embodiment. As shown in FIG. 2, camera 110 may include an optics chain 210, a sensor array 220, a bus 225, an image processor 230, a controller 240, a memory 245, a video encoder 250, and/or a communication interface 260. In one embodiment, camera 110 may include one or more motor controllers 270 (e.g., three) and one or more motors 272 (e.g., three) for panning, tilting, and zooming camera 110.

Optics chain 210 includes an enclosure that directs incident radiation (e.g., light, visible light, infrared waves, millimeter waves, etc.) to a sensor array 220 to capture an image based on the incident radiation. Optics chain 210 includes lenses 212 collect and focus the incident radiation from a monitored area onto sensor array 220.

Sensor array 220 may include an array of sensors for registering, sensing, and measuring radiation (e.g., light) incident or falling onto sensor array 220. The radiation may be in the visible light wavelength range, the infrared wavelength range, or other wavelength ranges. Sensor array 220 may include, for example, a charged coupled device (CCD) array and/or an active pixel array (e.g., a complementary metal-oxide-semiconductor (CMOS) sensor array). Sensor array 220 may also include a microbolometer (e.g., when camera 110 includes a thermal camera or detector).

Sensor array 220 outputs data that is indicative of (e.g., describes properties or characteristics) the radiation (e.g., light) incident on sensor array 220. For example, the data output from sensor array 220 may include information such as the intensity of light (e.g., luminance), color, etc., incident on one or more pixels in sensor array 220. The light incident on sensor array 220 may be an "image" in that the light may be focused as a result of lenses in optics chain 210.

Sensor array 220 can be considered an "image sensor" because it senses images falling on sensor array 220. As the term is used herein, an "image" includes the data indicative of the radiation (e.g., describing the properties or characteristics of the light) incident on sensor array 220. Accordingly, the term "image" may also be used to mean "image sensor data" or any data or data set describing an image. Further, a "pixel" may mean any region or area of sensor array 220 for which measurement(s) of radiation are taken (e.g., measurements that are indicative of the light incident on sensor array 220). A pixel may correspond to one or more (or less than one) sensor(s) in sensor array 220. In alternative embodiments, sensor 240 may be a linear array that may use scanning hardware (e.g., a rotating mirror) to form images, or a non-array sensor which may rely upon image processor 230 and/or controller 240 to produce image sensor data. Video encoder 250 may encode image sensor data for transmission to other device in environment 100, such as station 125 and/or VMS 150. Video encoder 250 may use video coding techniques such as video coding standards of the ISO/MPEG or ITU-H.26X families.

Bus 225 is a communication path that enables components in camera 110 to communicate with each other. Controller 240 may control and coordinate the operations of camera 110. Controller 240 and/or image processor 230 perform signal processing operations on image data captured by sensor array 220. Controller 240 and/or image processor 230 may include any type of single-core or multi-core processor, microprocessor, latch-based processor, and/or processing logic (or families of processors, microprocessors, and/or processing logics) that interpret and execute instructions. Controller 240 and/or image processor 230 may include or be coupled to a hardware accelerator, such as a graphics processing unit (GPU), a general purpose graphics processing unit (GPGPU), a Cell, a field programmable gate array (FPGA), an application specific integrated circuit (ASIC), and/or another type of integrated circuit or processing logic.

Controller 240 may also determine and control the desired focus and position (e.g., tilt and zoom) of camera 110. To do so, controller 240 sends commands to one or more motor controllers 270 to drive one or more motors 272 to tilt and/or pan camera 110 or optically zoom lenses 212.

Memory 245 may include any type of volatile and/or non-volatile storage device that stores information and/or instructions. Memory 245 may include a random access memory (RAM) or any type of dynamic storage device, a read-only memory (ROM) device or any type of static storage device, a magnetic or optical recording memory device and its corresponding drive, or a removable memory device. Memory 245 may store information and instructions (e.g., applications and/or an operating system) and data (e.g., application data) for use by processor camera 110.

Memory 245 may store instructions for execution by controller 240 and/or image processor 230. The software instructions may be read into memory 245 from another computer-readable medium or from another device. The software instructions may cause controller 240, video encoder 260, and/or image processor 230 to perform processes described herein. For example, camera 110 may perform operations relating to the image processing (e.g., encoding, transcoding, detecting objects, etc.) in response to controller 240, video encoder 250, and/or image processor 230 executing software instructions stored in memory 245. Alternatively, hardwired circuitry (e.g., logic) may be used in place of, or in combination with, software instructions to implement processes described herein.

Communication interface 260 includes circuitry and logic circuitry that includes input and/or output ports, input and/or output systems, and/or other input and output components that facilitate the transmission of data to another device. For example, communication interface 260 may include a network interface card (e.g., Ethernet card) for wired communications or a wireless network interface (e.g., a WiFi) card for wireless communications.

Although FIG. 2 shows exemplary components of camera 110, in other implementations, camera 110 may include fewer components, different components, differently arranged components, or additional components than depicted in FIG. 2. Additionally or alternatively, one or more components of camera 110 may perform functions described as performed by one or more other components of camera 110. For example, controller 240 may perform functions described as performed by image processor 230 and vice versa. Alternatively or additionally, camera 110 may include a computing module as described below with respect to FIG. 3.

Figure 3:
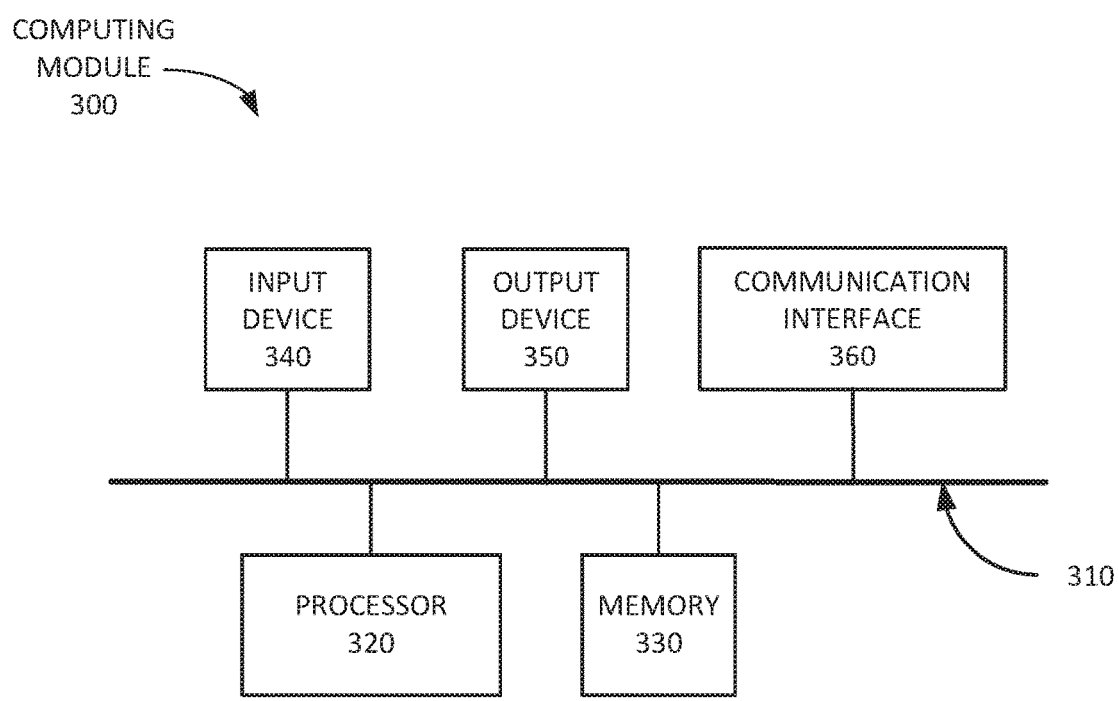
FIG. 3 is a block diagram illustrating exemplary components of a computing module in one embodiment.

FIG. 3 is a block diagram illustrating exemplary components of a computing module in one embodiment. Devices such as VMS 150, eye-tracking system 140, and/or display devices 130 may include one or more computing modules 300. As shown in FIG. 3, computing module 300 may include a bus 310, a processor 320, a memory 330, and/or a communication interface 360. In some embodiments, computing module 300 may also include an input device 340 and/or an output device 350.

Bus 310 includes a path that permits communication among the components of computing module 300 or other devices. Processor 320 may include any type of single-core processor, multi-core processor, microprocessor, latch-based processor, and/or processing logic (or families of processors, microprocessors, and/or processing logics) that interprets and executes instructions. Processor 320 may include an ASIC, an FPGA, and/or another type of integrated circuit or processing logic. Processor 320 may include or be coupled to a hardware accelerator, such as a GPU, a GPGPU, a Cell, a FPGA, an ASIC, and/or another type of integrated circuit or processing logic.

Memory 330 may include any type of volatile and/or non-volatile storage device that stores information and/or instructions. Memory 330 may include a RAM or any type of dynamic storage device, a ROM or any type of static storage device, a magnetic or optical recording memory device and its corresponding drive, or a removable memory device. Memory 330 may store information and instructions (e.g., applications and an operating system) and data (e.g., application data) for use by processor 320.

Memory 330 may store instructions for execution by processor 320. The software instructions may be read into memory 330 from another computer-readable medium or from another device. The software instructions may cause processor 320 to perform processes described herein. Alternatively, hardwired circuitry (e.g., logic) may be used in place of, or in combination with, software instructions to implement processes described herein.

The operating system includes software instructions for managing hardware and software resources of computing module 300. For example, the operating system may include Linux, Windows, OS X, Android, an embedded operating system, etc. Applications and application data may provide network services or include applications, depending on the device in which the particular computing module 300 is found.

Communication interface 360 may include a transmitter and/or receiver (e.g., a transceiver) that enables computing module 300 to communicate with other components, devices, and/or systems. Communication interface 360 may communicate via wireless communications (e.g., radio frequency, infrared, etc.), wired communications, or a combination thereof. Communication interface 360 may include a transceiver that converts baseband signals to radio frequency (RF) signals or vice versa and may be coupled to an antenna.

Communication interface 360 may include a logical component that includes input and/or output ports, input and/or output systems, and/or other input and output components that facilitate the transmission of data to other devices. For example, communication interface 360 may include a network interface card (e.g., Ethernet card) for wired communications or a wireless network interface (e.g., a WiFi) card for wireless communications.

Some devices may also include input device 340 and output device 350. Input device 340 may enable a user to input information into computing module 300. Input device 370 may include a keyboard, a mouse, a pen, a microphone, a camera, a touch-screen display, etc.

Output device 350 may output information to the user. Output device 350 may include a display, a printer, a speaker, etc. Input device 340 and output device 350 may enable a user interact with applications executed by computing module 300. In the case of a "headless" device (such as a deployed remote camera), input and output is primarily through communication interface 360 rather than input device 340 and output device 350.

Computing module 300 may include other components (not shown) that aid in receiving, transmitting, and/or processing data. Moreover, other configurations of components in computing module 300 are possible. In other implementations, computing module 300 may include fewer components, different components, additional components, or differently arranged components than depicted in FIG. 3. Additionally or alternatively, one or more components of computing module 300 may perform one or more tasks described as being performed by one or more other components of computing module 300.

Figure 4:
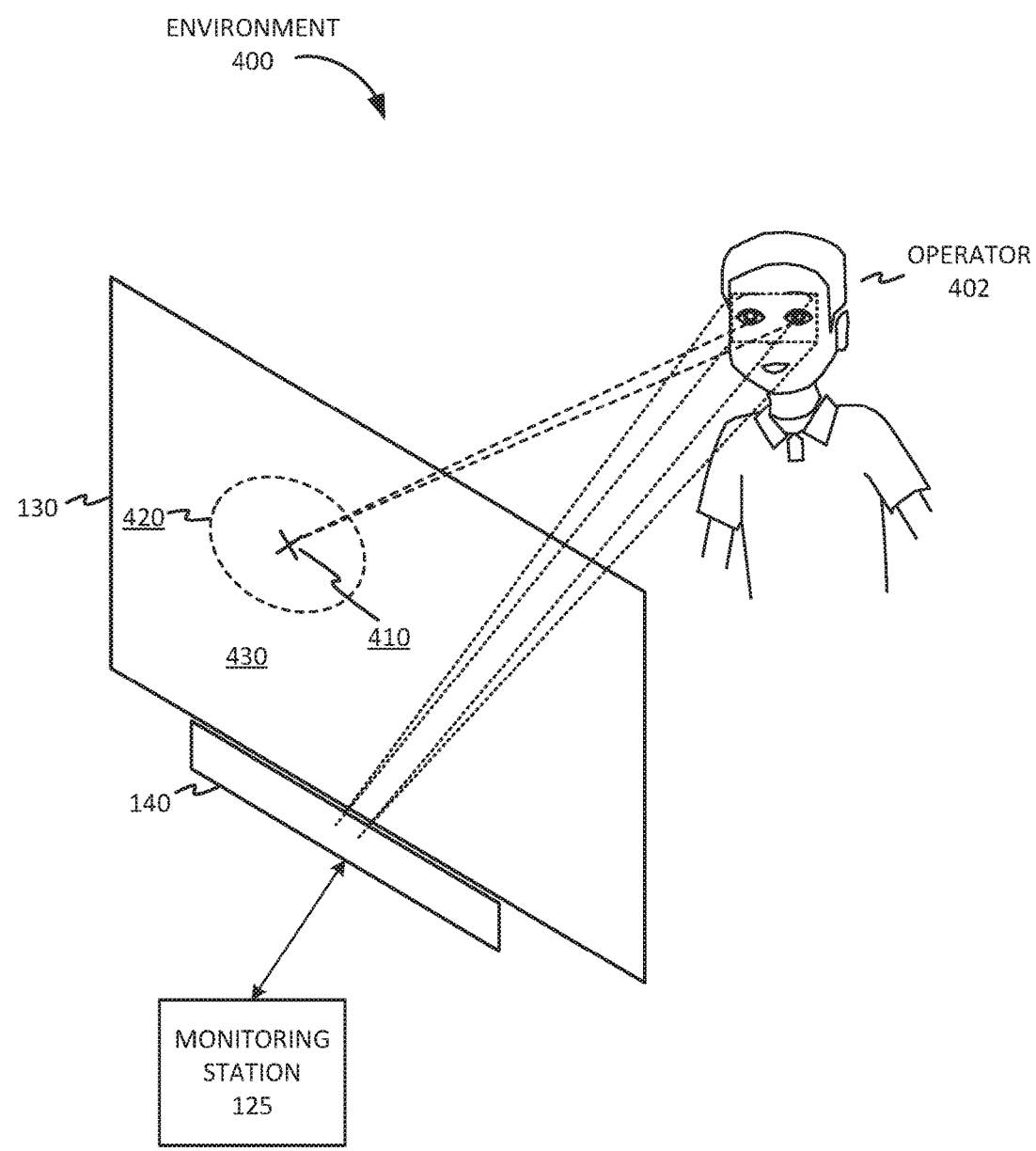
FIG. 4 illustrates an environment in which an operator views a display having an eye tracker in one embodiment.

FIG. 4 illustrates an exemplary environment 400 of an operator 402 viewing display 130 having eye tracker 140. Display 130 may include any type of display for showing information to operator 402. Operator 402 views display 130 and can interact with VMS 150 via an application running on monitoring station 125. For example, operator 402 may watch a video of area 106. Monitoring station 125 may sound an alarm when, according to rules, there is motion in area 106. Operator 402 may then respond silence the alarm via a keyboard interacting with an application running on monitoring station 125.

Eye tracker 140 includes a sensor (e.g., a camera) that enables monitoring station 125 to determine where the eyes of operator 402 are focused. In FIG. 4, for example, operator 402 sits in front of display 130 and the sensor in eye tracker 140 senses the eyes of operator 402. For example, eye tracker 140 may determine a gaze point 410, which may be represented as a location (e.g. pixel value) on display 130. Based on the relative position of the operator and the display 130, a foveal vision area 420 (or "area 420") corresponding to the foveal vision of operator 402 may be estimated. Foveal vision corresponds to the detailed visual perception of the eye, and approximately subtends 1-2 solid degrees. Accordingly, area 420 on display 130 may be calculated and understood to correspond to the part of operator's 402 vision with full visual acuity. In an alternative embodiment, area 420 may be determined experimentally during a setup procedure for a particular operator 402. Area 420 is in contrast to peripheral vision area 430 outside of foveal vision area 420, which corresponds to the peripheral vision of operator 402. Gaze point 410 is approximately in the center of area 420 and corresponds to the line-of-sight from gaze point 410 to the eyes of operator 402. In one embodiment, information identifying gaze point 410 may be transmitted to video management system 150.

Figure 5A:
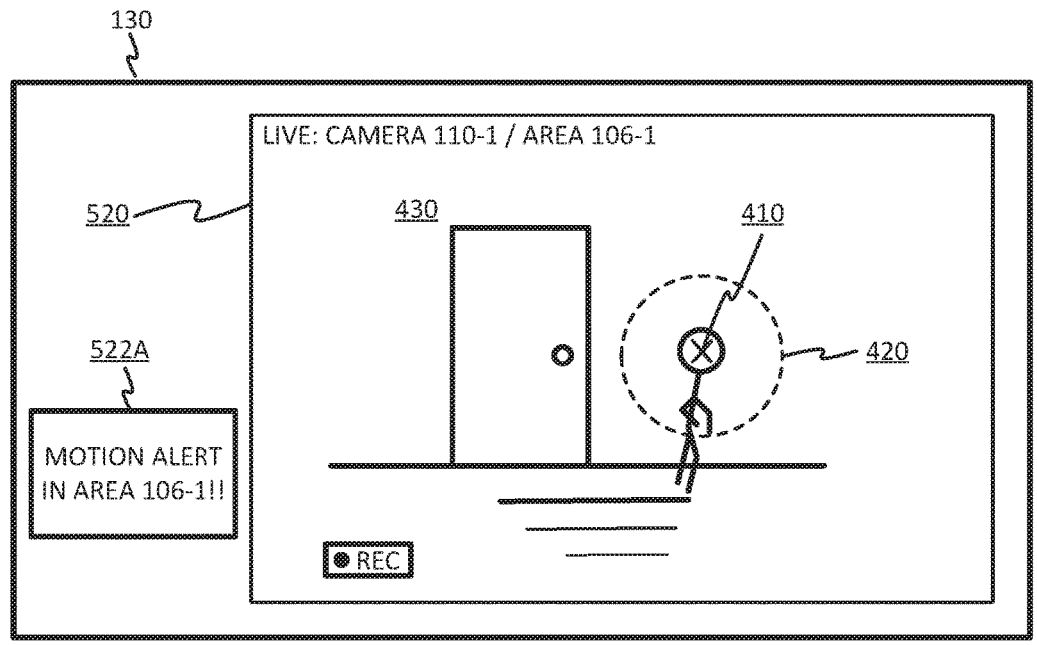
FIGS. 5A and 5B illustrate display from the perspective of an operator in two embodiments.

FIG. 5A illustrates display 130 from the perspective of operator 402. As shown in FIG. 5A, display 130 includes gaze point 410, foveal vision area 420, and peripheral vision area 430. Display 130 also includes a video frame 520 in which a video stream is presented to operator 402. In this example, frame 520 shows a video stream from camera 110-1 of area 106-1, which happens to include a door and an individual who appears to be moving. Operator's 402 foveal vision area 420 encompasses the individual and gaze point 410 is directly on the individual's face. The door displayed in frame 520, on the other hand, appears in operator's 402 peripheral vision area 430. In one example described in more detail below, when motion is sensed in area 106-1, then station 125-1 displays the following alert is displayed in a window 522A of display 130: MOTION ALERT IN AREA 106-1.

Based on the location of gaze point 410 and/or area 420, different update rates for blocks in inter-frames may be specified when encoding video streams, so that the information generated by eye tracker 140 may be interpreted as a user input to the cameras 110 (possibly via video management system 150). For example, if eye tracker 140-1 determines that operator 402 is viewing the upper portion of a person as shown in FIG. 5A, video data (e.g., blocks) that lie in area 420 may be updated to preserve motion and/or spatial details when generating inter-frames during encoding. On the other hand, video data which lies outside area 420 may be designated to have skip blocks used for generating inter-frames, thus blocks would not be updated as frequently to reduce bit rates.

Figure 5B:
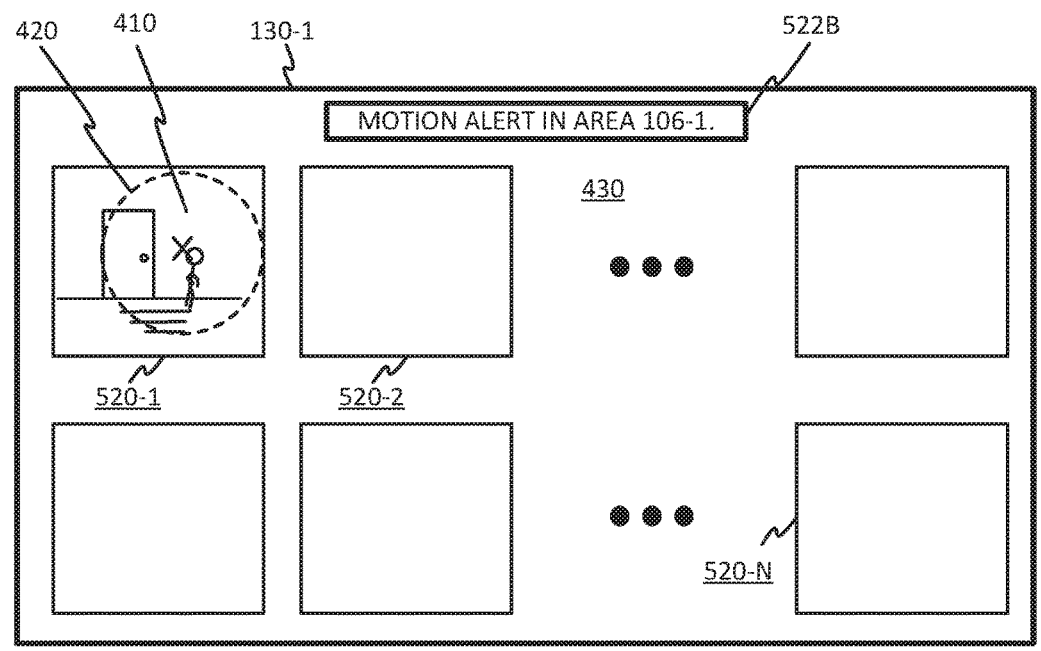

FIG. 5B also illustrates display 130 from the perspective of operator 402. In contrast to FIG. 5A, however, display 130 in FIG. 5B shows numerous frames 520-1 through 520-N (individually "frame 520-x"; plurally "frames 520"). Each frame 520-1 through 520-N may present a different video stream so operator 402 can monitor more than one area. The different streams may be produced by different cameras 110-1 through 110-M. Alternatively or additionally, each frame 520-1 though 520-N may display different streams generated by a common camera 110-x. For example, camera 110-x may use a "fisheye" lens and capture video from an extended angular area. The video may be processed to reduce distortions introduced by the fisheye lens, and separate the extended angular area into separate video streams corresponding to different areas, which may be separately presented in frames 520-1 through 520-N. As with FIG. 5A, display 130 in FIG. 5B includes gaze point 410, foveal vision area 420, and peripheral vision area 430.

In this example, frame 520-1 may show a video stream from camera 110-1 of area 106-1; video frame 520-2 may show a video stream from camera 110-2 (not shown) of area 106-2 (not shown); etc. Operator's 402 foveal vision area 420 in FIG. 5B encompasses the majority of frame 520-1 and gaze point 410 is close to the individual's face. The door displayed in frame 520 is also in foveal vision area 420. The other frames 520-2 through 520-N, on the other hand, are in operator's 402 peripheral vision area 430.

The location of gaze point 410 and/or foveal vision area 420 may be used to select and/or designate a particular frame 520-x for subsequent processing that may be different from other frames 520. For example, as shown in FIG. 5B, gaze point 410 may be used to indicate that frame 520-1 is a frame of interest to the operator. Accordingly, the video monitoring system may allocate more resources to frame 520-1 (e.g., bandwidth and/or processing resources) to improve the presentation of the video stream in frame 520-1, and reduce resources allocated to other streams corresponding to frames which are not the focus (e.g., in the peripheral vision) of the operator. Specifically, if eye tracker 140-1 determines that operator 402 is viewing frame 520-1 as shown in FIG. 5B, video data which lies in area 420 may be updated to preserve motion and/or spatial details when generating inter-frames during encoding. On the other hand, video data for the other frames 520-2 through 520-N, which lie outside area 420, may be designated to have skip blocks used for generating inter-frames, thus blocks would not be updated as frequently to reduce bit rates in frames 520-2 through 520-N.

Figure 6:
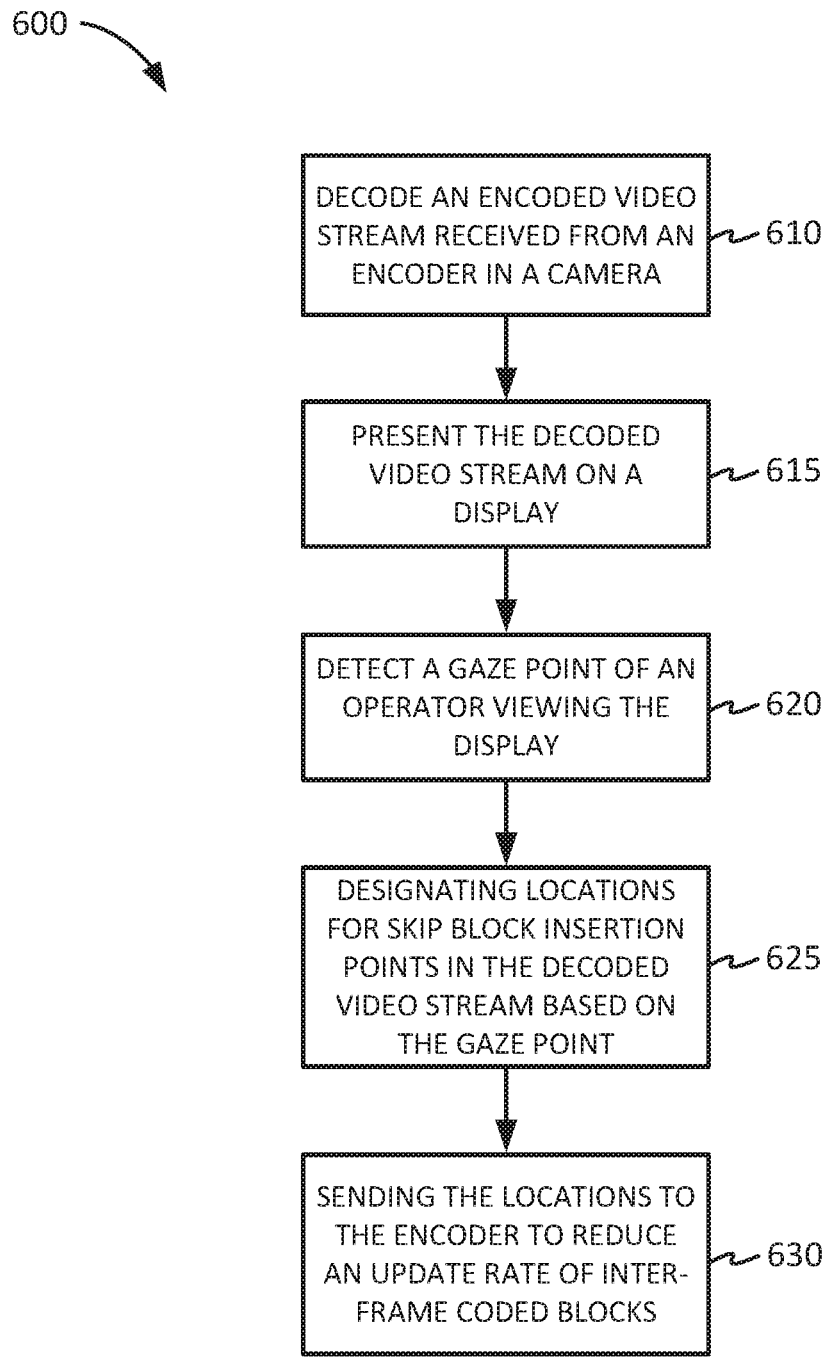
FIG. 6 is a flowchart illustrating an exemplary process for decoding video data based on gaze sensing.

FIG. 6 is a flowchart illustrating an exemplary process 600 for decoding video data based on gaze sensing. In an embodiment, process 600 may be performed by a client device (e.g., monitoring station 125-x, eye tracker 140-x, and display 130-x), by executing instructions processor 320. The instructions may be stored in memory 330. In an alternative embodiment, process 600 may be performed by VMS 150.

In an embodiment, process 600 may initially include decoding an encoded video stream received from an encoder (e.g. video encoder 250) associated with a camera 110 (block 610). The encoded video stream, which may be received at monitoring station 125 via network 120, may be generated by camera 110-x imaging object 102-x in monitored area 106-x. Process 600 may further include presenting the decoded video stream on display 130 of monitoring station 125 (block 615), and detecting gaze point 410 of operator 402 viewing display 130 (block 620). Process 600 may include designating locations associated with the decoded video stream, based upon gaze point 410, as skip block insertion points (block 625), and sending the locations to video encoder 250, where video encoder 250 may reduce an update rate of inter-frame coded blocks corresponding to the skip block insertion points when encoding video data produced by camera 110.

Process 600 may further include presenting the decoded video stream in a window 520 having a primary focus of operator 402 on display 130 of the monitoring station 125, and determining that gaze point 410 of operator 402 is within the boundaries of window 520 having the primary focus of operator 402. Process 600 may further include determining a foveal vision area 420 within the window having the primary focus of operator 402. Area 420 on display 130 may be calculated, based on the distance between operator 402 and display 130. Process 600 may further include designating locations associated with the decoded video stream outside foveal vision area 420 as skip block insertion points.

In another embodiment, monitoring station 125 may receive multiple video streams from one or more cameras 110 for presentation on display 130. In one example, multiple streams may come from the same camera 130-x having a fish-eye lens, which collects video from a wide field of view (e.g., 360 degrees) and then de-warps different parts of the view to produce a plurality of separate, undistorted video streams. Additionally or alternatively, multiple video streams may be produced by a plurality of cameras 110 which may collect different portions of monitored area 106. Accordingly, process 600 may further include decoding one or more additional encoded video stream(s), presenting the decoded video stream and the additional decoded video stream(s) each in separate windows from a plurality of windows 520 on display 130 of the monitoring station 125. Alternatively, additional video stream(s) may be presented on an additional display of the monitoring station 125. Process 600 may include determining, based upon gaze point 410, a window 520-1 from the plurality of windows 520 having a primary focus of operator 402, and designating locations as skip block insertion points within the decoded video stream associated with the at least one window 520-2 through 520-N not having the primary focus of operator 402. Process 600 may further include determining, based upon gaze point 410, foveal vision area 420 within window 520-1 having the primary focus of operator 402, and designating locations outside foveal vision area 420 as skip block insertion points in the decoded video stream associated with window 520-1 having the primary focus of operator 402.

Process 600 may further include determining a group of pictures (GOP) length for a secondary decoded video stream associated with the at least one window (520-2 through 520-N) not having the primary focus of operator 402 which is greater than the GOP length for the decoded video stream associated with window 520-1 having the primary focus of the operator, and sending the determined GOP length to encoder 250 associated with the secondary decoded video stream for encoding video associated with the window(s) 520-2 through 520-N not having the primary focus of the operator. Process 600 may further include determining a distance from gaze point 410 to at least one window (e.g., 520-2 through 520-N) not having the primary focus of the operator, and increasing the determined GOP length as the distance increases between gaze point 410 and at least one window (e.g., 520-2 through 520-N) not having the primary focus of operator 402.

Regarding the GOP length, typical video collection scenarios may only use I-frames and P-frames with a GOP length of 30 images at 30 frames per second. This implies that one I-frame may be followed by 29 P-frames. In such a case, the macroblocks in areas not being looked at by operator 402 could be lowered to 1 update per second while the macroblocks being looked at could be the full 30 updates per second. The lower update rate could also be set to 2, 3 or 5 updates per second while maintaining a steady rate of the updates. If the update rate does not need to be perfectly steady, the updates could be anything between 1 and 30 per second. In an embodiment, the GOP-length may be dynamic based upon the focus of operator 402 as determined by eye tracker 140.

Process 600 may further include tracking gaze point 410 for a time period or a distance exceeding a predetermined threshold as gaze point 410 moves within window 520-1 having a primary focus of operator 402, correlating the movement of gaze point 410 and a moving object in the decoded video, designating the moving object as an object of interest, and preventing the designation of locations as skip block insertion points for locations associated with the object of interest in the decoded video stream. Process 600 may also include generating an identifier representing the designated object of interest, and saving the identifier in a database containing metadata of the decoded video stream.

Process 600 may further include determining that gaze point 410 is maintained at substantially the same position on display 130 for a time period exceeding a predetermined threshold, and then increasing a magnification of the decoded video stream in a predetermined area around gaze point 410. Alternatively, process 600 may include determining that gaze point 420 is maintained for a time period exceeding a predetermined threshold on window 520-1 having the primary focus of operator 402, and then increasing the magnification of window 520-1 having the primary focus of the operator in relation to other windows (520-2 through 520-N) not having the primary focus of operator 402.

Process 600 may also include determining, as a result of blinking by operator 402, that gaze point 410 disappears and reappears a predetermined number of times within a predetermined period of time, while maintaining substantially the same position on display 130. Process 600 may further include executing a command associated with the decoded video stream in the area around gaze point 410. Process 600 may also include changing the magnification of the decoded video stream in the area around the gaze point, or saving an identifier in a database tagging the decoded video stream in the area around the gaze point.

Process 600 may further include tracking positions of gaze point 410 over a period of time, and predicting the next position of the gaze point based on the tracked positions of the gaze point. The prediction may be performed using known tracking and/or statistical estimation techniques. Accordingly, process 600 may minimize, or at least reduce, the delay between when gaze point 410 is shifted and when a full update rate of the inter-frames associated with that position is achieved. For example, cameras 110 used in casinos may be required to have a very low latency. In those cases, the delay might be so low that operator 402 is not affected by having to wait for full update rate each time the gaze point 410 is moved. If camera 110 do not react quickly enough, the aforementioned prediction of gaze point 410 may be used.

In order to decode video streams having skip block insertion points, process 600 may further include receiving a merged encoded video stream which includes a first component video stream having inter-frames which include skip blocks, and a second component video stream having a lower pixel density than the first component video stream sequence, where the second component video stream is temporally and spatially associated with the first component video stream. Process 600 may further include identifying skip blocks in inter-frames of the first component video stream, and decoding inter-frames of the first component video stream in blocks which are not skip blocks. Process 600 may further include decoding inter-frames of the second component video stream, upscaling inter-frames in the decoded second component video stream to match the pixel density of the inter-frames in the decoded first component video stream, identifying pixels in the upscaled decoded second component video stream which correspond to the skip blocks locations in the decoded first component video stream, extracting the identified pixels in the decoded second component video stream, and inserting the extracted pixels in corresponding locations of the skip blocks in the decoded first encoded bit stream.

Figure 7:
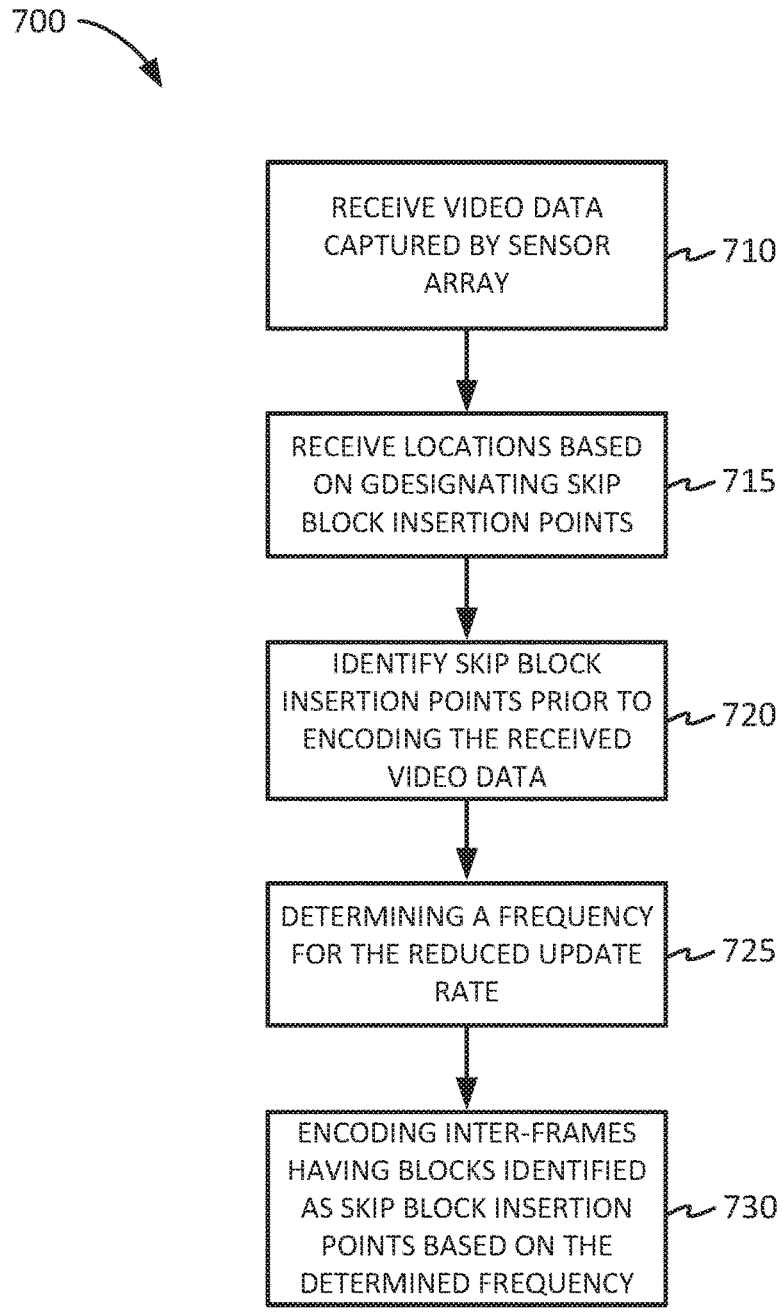
FIG. 7 is a flowchart of an exemplary process for encoding video data based on gaze sensing.

FIG. 7 is a flowchart showing an exemplary process 700 for encoding video data based on gaze sensing. In an embodiment, process 700 may be performed in camera 110, by executing instructions on controller 240, image processor 230, or video encoder 250, or any combination thereof. The instructions may be stored in a common memory 245, and/or stored at least in part on individual memories dedicated to controller 240, image processor 230, and video encoder 250.

Process 700 may include receiving video data captured by at least one sensor array 220 (block 710). The captured video data corresponds to a monitored area 106 associated with camera 110. Process 700 may further include receiving locations associated with a decoded video stream to designate skip block insertion points for encoding the received video data, where the locations are based on gaze points 410 determined by eye tracker 140. Process 700 further includes identifying, based upon the received locations, skip block insertion points prior to encoding the received video data (block 720). The skip block insertion points may designate blocks within inter-frames having reduced update rates. Process 700 may include determining, for the identified skip block insertion points, a frequency for the reduced update rate (block 725). The frequency may represent how many times a particular block is updated per second in an inter-frame within a GOP. Process 700 may further include encoding inter-frames having blocks associated with the identified skip block insertion points based on the determined frequency (block 730).

In order to encode video streams having skip block insertion points, process 700 may include generating a first video sequence from the received video data, and generating a second video sequence from the received video data having a lower pixel density than the first video sequence. The second video sequence may be temporally and spatially similar to the first video sequence. Process 700 may further include indicating pixels of relevance in the first video sequence, where the identified skip block insertion points are designated as not being relevant, and encoding the indicated pixels of relevance in the first video sequence to produce a first encoded video stream. The pixels designated as not being relevant may be encoded using skip blocks. Process 700 may further include encoding the second video sequence to produce a second encoded video stream, merging the first encoded video stream and the second encoded video stream, and then sending the merged encoded video stream to monitoring station 125.

In an embodiment, generating the second video sequence may include digitally downsampling the first video sequence in two dimensions. In another embodiment, indicating pixels of relevance may include generating masks for the first video sequence.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while an order of signal and/or logic have been described with respect to FIGS. 6 and 7, the order of the blocks, logic flows, and/or signal flows may be modified in other implementations. Further, non-dependent blocks and/or signal flows may be performed in parallel.

This application incorporates by reference herein the following patent applications filed the same day as this patent application: U.S. patent application Ser. No. 15/395,893, titled "Gaze Heat Map," and filed Dec. 30, 2016; U.S. patent application Ser. No. 15/395,856, titled "Gaze Controlled Bitrate," filed Dec. 30, 2016; and U.S. patent application Ser. No. 15/395,403, titled "Alarm Masking Based on Gaze in Video Management System," filed Dec. 30, 2016.

It will be apparent that systems and/or processes, as described above, may be implemented in many different forms of software, firmware, and hardware in the implementations illustrated in the figures. The actual software code or specialized control hardware used to implement these systems and processes is not limiting of the embodiments. Thus, the operation and behavior of the systems and processes were described without reference to the specific software code, it being understood that software and control hardware can be designed to implement the systems and processes based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

The terms "comprises" and "comprising" specify the presence of stated features, integers, steps or components but does not preclude the presence or addition of one or more other features, integers, steps, components or groups thereof. The word "exemplary" is used to mean "serving as an example, instance, or illustration" of more than one example. Any embodiment described herein as "exemplary" does not necessarily imply it to be preferred or advantageous over other embodiments.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method for decoding video data based on gaze sensing, comprising:
   decoding an encoded video stream received from an encoder associated with a camera;
   presenting the decoded video stream on a display of a device;
   detecting a gaze point of an operator viewing the display;
   designating locations associated with the decoded video stream, based upon the gaze point, as skip block insertion points; and
   sending the locations to the encoder, wherein the encoder reduces an update rate of inter-frame coded blocks corresponding to the skip block insertion points when encoding video data produced by the camera.

2. The method of claim 1, further comprising:
   presenting the decoded video stream in a window having a primary focus of the operator on the display of the device;
   determining that the gaze point of the operator is within the boundaries of the window having the primary focus of the operator;
   determining a foveal vision area within the window having the primary focus of the operator; and
   designating locations associated with the decoded video stream outside the foveal vision area as skip block insertion points.

3. The method of claim 1, further comprising:
   decoding at least one additional encoded video stream;
   presenting the decoded video stream and the at least one additional decoded video stream each in separate windows from a plurality of windows on the display of the device, or on another display of the device;
   determining, based upon the gaze point, a window from the plurality of windows having a primary focus of the operator; and
   designating locations as skip block insertion points within the decoded video stream associated with the at least one window not having the primary focus of the operator.

4. The method of claim 3, further comprising:
   determining, based upon the gaze point, a foveal vision area within the window having the primary focus of the operator; and
   designating locations outside the foveal vision area as skip block insertion points in the decoded video stream associated with the window having the primary focus of the operator.

5. The method of claim 3, further comprising:
   determining a group of pictures (GOP) length for a secondary decoded video stream associated with the at least one window not having the primary focus of the operator which is greater than the GOP length for the decoded video stream associated with the window having the primary focus of the operator;
   sending the determined GOP length to an encoder associated with the secondary decoded video stream for encoding video associated with the at least one window not having the primary focus of the operator.

6. The method of claim 5, further comprising:
   determining a distance from the gaze point to the at least one window not having the primary focus of the operator; and
   increasing the determined GOP length as the distance increases between the gaze point and the at least one window not having the primary focus of the operator.

7. The method of claim 2, further comprising:
   tracking a gaze point for a time period or a distance exceeding a predetermined threshold as the gaze point moves within the window having a primary focus of the operator;
   correlating the movement of the gaze point and a moving object in the decoded video;
   designating the moving object as an object of interest; and
   preventing the designation of locations as skip block insertion points for locations associated with the object of interest in the decoded video stream.

8. The method of claim 7, further comprising:
   generating an identifier representing the designated object of interest; and
   saving the identifier in a database containing metadata of the decoded video stream.

9. The method of claim 1, further comprising:
   determining that the gaze point is maintained at substantially the same position on the display for a time period exceeding a predetermined threshold; and increasing a magnification of the decoded video stream in a predetermined area around the gaze point.

10. The method of claim 3, further comprising:
determining that the gaze point is maintained for a time period exceeding a predetermined threshold on the window having the primary focus of the operator; and
increasing the magnification of the window having the primary focus of the operator.

11. The method of claim 1, further comprising:
determining, as a result of blinking by the operator, that the gaze point disappears and reappears a predetermined number of times within a predetermined period of time, while maintaining substantially the same position on the display; and
executing a command associated with the decoded video stream in the area around the gaze point.

12. The method of claim 11, wherein executing the command further comprises:
changing the magnification of the decoded video stream in the area around the gaze point, or saving an identifier in a database tagging the decoded video stream in the area around the gaze point.

13. The method of claim 1, further comprising:
tracking positions of the gaze point over a period of time; and
predicting the next position of the gaze point based on the tracked positions of the gaze point.

14. The method of claim 1, further comprising:
receiving a merged encoded video stream which includes a first component video stream having inter-frames which include skip blocks, and a second component video stream having a lower pixel density than the first component video stream sequence, wherein the second component video stream is temporally and spatially associated with the first component video stream;
identifying skip blocks in inter-frames of the first component video stream;
decoding inter-frames of the first component video stream in blocks which are not skip blocks;
decoding inter-frames of the second component video stream;
upscaling inter-frames in the decoded second component video stream to match the pixel density of the inter-frames in the decoded first component video stream;
identifying pixels in the upscaled decoded second component video stream which correspond to the skip blocks locations in the decoded first component video stream;
extracting the identified pixels in the decoded second component video stream; and
inserting the extracted pixels in corresponding locations of the skip blocks in the decoded first encoded bit stream.

15. A method for encoding video data based on gaze sensing, comprising
receiving video data captured by at least one sensor array;
receiving locations associated with a decoded video stream to designate skip block insertion points for encoding the received video data, wherein the locations are based on gaze points determined at a device;
identifying, based upon the received locations, skip block insertion points prior to encoding the received video data, wherein the skip block insertion points designate blocks within inter-frames having reduced update rates;
determining, for the identified skip block insertion points, a frequency for the reduced update rate; and
encoding inter-frames having blocks associated with the identified skip block insertion points based on the determined frequency.

16. The method of claim 15, further comprising:
generating a first video sequence from the received video data;
generating a second video sequence from the received video data having a lower pixel density than the first video sequence, wherein the second video sequence is temporally and spatially similar to the first video sequence;
indicating pixels of relevance in the first video sequence, wherein the identified skip block insertion points are designated as not being relevant;
encoding the indicated pixels of relevance in the first video sequence to produce a first encoded video stream, wherein the pixels designated as not being relevant are encoded using skip blocks;
encoding the second video sequence to produce a second encoded video stream;
merging the first encoded video stream and the second encoded video stream; and
sending the merged encoded video stream to the device.

17. The method of claim 15, wherein generating the second video sequence further comprises:
digitally downsampling the first video sequence in two dimensions.

18. The method of claim 16, further indicating pixels of relevance further comprises:
generating masks for the first video sequence.

19. A device configured to decode video data based on gaze sensing, comprising:
a display;
a communication interface configured to exchange data over a network;
a processor, coupled to the display and the communication interface; and
a memory, coupled to the processor, which stores instructions causing the processor to:
decode an encoded video stream received from an encoder associated with a camera,
present the decoded video stream on the display,
detect a gaze point of an operator viewing the display,
designate locations associated with the decoded video stream, based upon the gaze point, as skip block insertion points, and
send the locations to the encoder, wherein the encoder reduces an update rate of inter-frame coded blocks corresponding to the skip block insertion points when encoding video data produced by the camera.

20. The device of claim 19, wherein the memory comprises instructions that further cause the processor to:
present the decoded video stream in a window having a primary focus of the operator on the display of the device,
determine that the gaze point of the operator is within the boundaries of the window having the primary focus of the operator,
determine a foveal vision area within the window having the primary focus of the operator, and
designate locations associated with the decoded video stream outside the foveal vision area as skip block insertion points.

21. The device of claim 19, wherein the memory comprises instructions that further cause the processor to:
decode at least one additional encoded video stream, present the decoded video stream and the at least one additional decoded video stream each in separate windows from a plurality of windows on the display, determine, based upon the gaze point, a window from the plurality of windows having a primary focus of the operator, and designate locations as skip block insertion points within the decoded video stream associated with the at least one window not having the primary focus of the operator.

22. The device of claim 21, wherein the memory comprises instructions that further cause the processor to:

determine, based upon the gaze point, a foveal vision area within the window having the primary focus of the operator, and designate locations outside the foveal vision area as skip block insertion points in the decoded video stream associated with the window having the primary focus of the operator.

23. A camera configured to encode video data based on gaze sensing, comprising:

a sensor array;

a communication interface configured to exchange data over a network;

a controller, an image processor, and a video encoder, coupled to the sensor array and the communication interface; and a memory, coupled to the controller, the image processor, and the video encoder, which stores instructions causing at least one of the controller, the image processor, or the video encoder to:

receive video data captured by the sensor array, receive locations associated with a decoded video stream to designate skip block insertion points for encoding the received video data, wherein the locations are based on gaze points determined at a client device, identify, based upon the received locations, skip block insertion points prior to encoding the received video data, wherein the skip block insertion points designate blocks within inter-frames having reduced update rates, determine, for the identified skip block insertion points, a frequency for the reduced update rate, and encode inter-frames having blocks associated with the identified skip block insertion points based on the determined frequency.

24. The camera of claim 23, wherein the memory comprises instructions further causing at least one of the controller, the image processor, or the video encoder to:

generate a first video sequence from the received video data, generate a second video sequence from the received video data having a lower pixel density than the first video sequence, wherein the second video sequence is temporally and spatially similar to the first video sequence, indicate pixels of relevance in the first video sequence, wherein the identified skip block insertion points are designated as not being relevant, encode the indicated pixels of relevance in the first video sequence to produce a first encoded video stream, wherein the pixels designated as not being relevant are encoded using skip blocks, encode the second video sequence to produce a second encoded video stream, merge the first encoded video stream and the second encoded video stream, and send the merged encoded video stream to the client device.

* * * * *